US009435092B2

(12) United States Patent
Yang et al.

(10) Patent No.: US 9,435,092 B2
(45) Date of Patent: Sep. 6, 2016

(54) DAM CONSTRUCTION METHOD UTILIZING REFRIGERATION TECHNIQUE

(75) Inventors: Ju Yang, Jurong (CN); Guan Yang, Jurong (CN)

(73) Assignee: Ju Yang, Jurong, Jiangsu (CN)

( * ) Notice: Subject to any disclaimer, the term of this patent is extended or adjusted under 35 U.S.C. 154(b) by 1308 days.

(21) Appl. No.: 12/988,799

(22) PCT Filed: Apr. 16, 2009

(86) PCT No.: PCT/CN2009/071323
§ 371 (c)(1),
(2), (4) Date: Oct. 20, 2010

(87) PCT Pub. No.: WO2009/129727
PCT Pub. Date: Oct. 29, 2009

(65) Prior Publication Data
US 2011/0033241 A1 Feb. 10, 2011

(30) Foreign Application Priority Data
Apr. 24, 2008 (CN) .......................... 2008 1 0023980

(51) Int. Cl.
*E02B 3/10* (2006.01)
*E02B 7/02* (2006.01)
*E02B 17/02* (2006.01)

(52) U.S. Cl.
CPC ................. *E02B 3/106* (2013.01); *E02B 7/02* (2013.01); *E02B 17/028* (2013.01); *B63B 2231/76* (2013.01)

(58) Field of Classification Search
CPC .......................... E02B 17/028; B63B 2231/76
USPC .................................. 405/107, 116, 130, 217
See application file for complete search history.

(56) References Cited

U.S. PATENT DOCUMENTS

| 3,372,550 | A | * | 3/1968 | Schroeder | 405/130 |
| 4,048,808 | A | * | 9/1977 | Duthweiler | 405/217 |
| 4,242,012 | A | * | 12/1980 | Utt | 405/217 |
| 4,373,836 | A | * | 2/1983 | Cox et al. | 405/217 |
| 4,431,346 | A | * | 2/1984 | Husebye | 405/217 |
| 4,432,669 | A | * | 2/1984 | Cox et al. | 405/217 |
| 4,441,029 | A | * | 4/1984 | Kao | 290/52 |
| 4,523,879 | A | * | 6/1985 | Finucane et al. | 405/217 |
| 4,549,836 | A | * | 10/1985 | Hemphill et al. | 405/61 |
| 4,567,731 | A | * | 2/1986 | Horan | 62/59 |
| 4,583,882 | A | * | 4/1986 | Szabo | 405/217 |
| 4,621,946 | A | * | 11/1986 | Page | 405/61 |
| 4,632,604 | A | * | 12/1986 | McKelvy | 405/217 |
| 4,699,545 | A | * | 10/1987 | Chen et al. | 405/217 |
| 4,846,580 | A | * | 7/1989 | Oury | 366/27 |
| 4,881,848 | A | * | 11/1989 | Wright et al. | 405/116 |
| 6,099,208 | A | * | 8/2000 | McAlister | 405/217 |
| 6,406,251 | B1 | * | 6/2002 | Vauthier | 415/7 |
| 6,712,558 | B2 | * | 3/2004 | McAlister | 405/217 |
| 6,831,373 | B1 | * | 12/2004 | Beaston | 290/43 |
| 6,935,832 | B1 | * | 8/2005 | Platt et al. | 415/8 |
| 2003/0223820 | A1 | * | 12/2003 | McAlister | 405/61 |
| 2009/0120688 | A1 | * | 5/2009 | Fabris | 175/18 |

FOREIGN PATENT DOCUMENTS

| CN | 1225978 A | 8/1999 |
| CN | 1066510 C | 5/2001 |
| CN | 1485503 A | 3/2004 |
| CN | 2843835 Y | 12/2006 |
| CN | 101270572 A | 9/2008 |
| GB | 2 071 295 A | 9/1981 |
| GB | 2071295 A | 9/1981 |
| GB | 2 185 770 A | 7/1987 |
| GB | 2185770 A | 7/1987 |
| WO | WO 86/06771 | 11/1986 |
| WO | WO 86/06771 A1 | 11/1986 |

OTHER PUBLICATIONS

International Search Report, dated Jul. 23, 2009, corresponding to PCT/CN2009/071323.
English Abstract, Publication No. CN1207150 A, dated Feb. 3, 1999, in the name of McAlister, which corresponds to CN 1066510 C listed above, 1 page.

* cited by examiner

*Primary Examiner* — Amber Anderson
*Assistant Examiner* — Patrick Lambe
(74) *Attorney, Agent, or Firm* — Lewis Roca Rothgerber Christie LLP

(57) ABSTRACT

A dam construction method utilizing refrigerating technology is provided, the method takes natural water as the material to construct the dam and constructs an ice dam body by utilizing the refrigerating technology. The method includes the following steps: choosing the forms and quantity of ice unit bodies, determining the positions and quantity of frozen contact points, manufacturing sufficient ice unit bodies by frozen units, choosing heat insulating material with high performance as the heat preservation layer to cover on the outside of the frozen ice unit bodies; temporarily fixing the ice unit bodies; quickly freezing the seams of the ice unit bodies to form a whole ice dam; mounting temporary generating equipment and completing the temporary dam body; thawing the ice dam body after a permanent dam body is completed.

5 Claims, No Drawings

DAM CONSTRUCTION METHOD UTILIZING REFRIGERATION TECHNIQUE

CROSS-REFERENCE TO RELATED APPLICATION(S)

This application is a National Phase Patent Application and claims the priority of International Application Number PCT/CN2009/071323, filed on Apr. 16, 2009, which claims priority of Chinese Patent Application Number 200810023980.1, filed on Apr. 24, 2008.

FIELD OF THE INVENTION

The present invention relates to a dam construction method, in particular to a dam construction method that utilizes natural water body as the dam material and utilizes freezing technique.

BACKGROUND OF THE INVENTION

As the global energy situation becomes more and more severe, it is an extremely urgent task to take full advantage of hydropower resources. In hydropower resource utilization projects, dam construction is an especially important link. Owing to a variety of factors in dam construction, such as long construction period, high investment, long ROI period, complex construction, significant impact on navigation and environment and so on, the utilization of hydropower resources develops very slowly. A great deal of hydropower resources can not be utilized fully and timely. Consequently, the energy crisis becomes more and more serious, and our living environment is increasingly deteriorated.

Presently, all dams are constructed with reinforced concrete. In view of the large size of dam, it is necessary to minimize the hydration heat and cost of concrete, namely, the amount of cement used should be minimized. Generally speaking, employing large-size aggregate can achieve that purpose. Therefore, usually the dam concrete is with degree 4 of gradation, in which the maximum size of aggregate can be up to 15 cm. However, if the conventional concrete adopts aggregate in larger size, it is suitable for use due to the limitation of mixing and vibrating capability.

Rock fill dam is a common dam type. At present, the common construction procedures of rolled rock fill dam are as follows: gather materials from the stock ground, transport the materials by truck directly onto the dam, and then roll the rock fill with a heavy vibrating roller to achieve the design compactness. Such construction procedures are simple and the dam construction cost is low. However, the size of rock fill dam is greater than the concrete dam; especially, rock fill dam usually has to be impervious, and therefore additional spillways must be arranged, which will result in significant increase of project cost. In addition, if clay core wall is used as the impervious body in rock fill dam, the construction will be easily interfered and will be sensitive to the climate, and the core wall may crack as a result of uneven subsidence. In recent years, reinforced concrete face rock fill dam has developed quickly, but there are still a lot of problems with regard to crack control of face.

There are mainly two existing concrete dam construction methods: column construction method and roller compacted concrete construction method.

The construction with typical column construction method is carried out by block placement, assisted with temperature control measures. That method has been widely applied in construction of concrete dams, such as the Three Gorges Concrete Gravity Dam in China. This method has obtained rich experience in assurance of concrete construction quality and concrete crack control, and presently the method is still the most commonly used method in concrete dam construction. However, with such a concrete construction method, a large quantity of formworks are required, and a variety of temperature control measures such as embedded cooling water pipes are required; in addition, the procedures are complex, the cost is high, and the construction speed is low.

The roller compacted concrete construction method was put forward by Professor Raphael (USA) in 1970s. This method employs zero-slump concrete and vibration rolling technique, characterized by high construction speed, simplified temperature control measures and low cost. More and more dams are constructed with roller compacted concrete nowadays, such as Shimenzi Arch Dam and Shapai Arch Dam in China. However, the inter-layer bonding strength of roller compacted concrete is relatively poor; especially, as a result of high construction speed and simplified temperature control, in the late stage of dam construction and early stage of dam operation, the concrete temperature is still high, therefore the built-up part may crack and has to be repaired. The cracks caused by temperature load are mainly a result of high hydration heat in roller compacted concrete, though the cement content in roller compacted concrete is lower than that in common concrete. To reduce the risk of cracking, structural measures such as induced joints and structural joints are taken for arch dams constructed with roller compacted concrete; however, the construction complexity is increased.

SUMMARY OF THE INVENTION

To overcome the drawbacks in conventional dam concrete construction methods, such as complex procedures, high cost, and low construction speed, etc., the present invention provides a dam construction method that utilizes natural water body as the dam material and utilizes freezing technique, which is based on freezing technique and utilizes natural water body as dam material. With this method, flow closure is completed quickly before the concrete dam is constructed, to form a temporary power generation works, which can be used as the permanent dam body or a temporary dam body, to provide enough energy and preferable construction conditions for constructing the permanent concrete dam. The method is characterized by short construction time, reduced investment, and environmental protection.

The object of the present invention is achieved by the following technical scheme:

A method of dam construction utilizing freezing technique, which utilizes natural water body as dam material and utilizes freezing technique to construct an ice dam body, comprising the following steps:

1) Choosing the forms, geometry size, shapes, and structural frameworks of unit body, determining the quantity of unit body, and arranging the locations and amount of freezing contacts, according to the dam structure;

2) Arranging unit body formwork according to the forms, geometry size, and shapes of the unit body, pre-reserving distribution sluice gates, and choosing a high-performance heat insulation material of insulation layer to cover the unit body formwork in the freezing part;

3) Pouring water into the unit body formwork to form unit water body, powering up and starting freezing machines to freeze the unit water body to below the freezing point to form solid ice unit body; repeating this step to produce enough ice unit body;

4) Towing the ice unit body with towing equipment to the place where the dam is to be constructed and fixing the ice unit body temporarily, arranging freezing contacts in the gaps between the ice unit bodies, and freezing quickly to form an integral ice dam;

5) Closing the distribution sluice gates from bottom to top successively, till all distribution sluice gates are closed; as the downstream level declines, installing and connecting sluice pipelines for temporary power generation from top to bottom, starting from the upper sluice gate, till the requirements for installation of temporary power generation equipment are met;

6) Installing temporary power generation equipment, and utilizing the temporary power generation equipment to supply power to the freezing machines, to prevent the solid ice unit body from melting down, and thereby form an ice dam; completing the construction of the temporary dam body;

7) Starting the construction of permanent concrete dam body; after the permanent dam body is placed, melting down the ice dam formed by the solid ice unit body, reclaiming the equipment, and completing the normal power generation works.

In step 4) of the present invention, the distribution sluice gates on the ice unit bodies are in fully open state. Since the density of the ice unit body is lower than the density of water and cavities are formed in the ice unit body, the ice unit body will float on water, causing excessive clearance between the bottom surfaces of ice unit body and the riverbed. To solve this problem, for the ice unit body submerged below the water surface, weight-enhancing material must be added into the cavities, to force the ice unit body to settle onto the riverbed. The ice unit body kept on or above water surface can be placed directly.

In view that a plurality sets of freezing contacts are arranged on the ice unit body and the ice dam is composed of a plurality of ice unit body, automatic monitoring and control systems are arranged at the freezing contacts and service passages are arranged for the freezing contacts on the ice unit body, in order to eliminate any possible failure of the freezing contacts timely.

In the present invention, the ice unit body is wrapped with a high-performance heat insulation material of insulation layer, and the freezing machines keep the ice unit body in low temperature during the entire process; therefore, the ice unit body will not melt down and can maintain enough strength.

In the present invention, the electric power consumption is calculated as follows:

According to the specific-heat capacity formula:

$$Q = cm\Delta t \quad (1)$$

$$1 \text{ kwh} = 3.6 \times 10^6 \text{ J}$$

$$1 K = 4.1868 \text{ J}$$

Take the Three Gorges Dam project for example (the efficiency factor is not taken into account):

Set the length×height×width $$3035 \text{ m} \times 185 \text{ m} \times 50 \text{ m} \times 1000 \text{ Kg/m}^3 \text{ (water density)} = 28.1 \times 10^9 \text{ Kg}$$

Set the temperature drop $\Delta t = 20°$ C.; then, the total power consumption is:

$$28.1 \times 10^9 \times 20 = 56 \times 10^{13} K$$

$$56 \times 10^{13} \times 4.1868 = 234.5 \times 10^{13} \text{ J}$$

The total electric power consumption is:

$$234.5 \times 10^{13} / 3.6 \times 10^6 = 65.14 \times 10^7 \text{ kwh}$$

Calculated with 0.5 Yuan/kwh, the required electric power cost is:

$$65.14 \times 10^7 \text{ kwh} \times 0.5 \text{ Yuan/kwh} = \text{RMB } 325.7 \text{ millions Yuan}$$

In contrast, the total static investment of the Three Gorges Dam is as high as RMB 50 billions Yuan.

The method provided in the present invention is based on freezing technique, and utilizes natural water body as dam material. With the method, flow closure can be accomplished quickly before the concrete dam is constructed, to form a temporary power generation works, which can be used as a permanent dam body or a temporary dam body to provide enough energy and preferable construction conditions for the subsequent construction of the permanent concrete dam, and thereby achieve the purpose of accelerating construction period, reducing investment, and protecting environment.

The method provided in the present invention can minimize the period of the early stage of dam construction, and thereby minimize the entire construction period of project, to assure the hydropower works to yield returns as soon as possible. With this method, since power generation can be achieved in the construction period, the works can not only supply power for dam construction but also supply power to the electric network to yield returns. The method of dam construction with freezing technique described in the present invention thoroughly changes the conventional underwater construction approach, makes the dam size more reasonable, reduces material consumption, ensures construction quality, and saves investment greatly. Moreover, with the freezing technique for dam construction, the ice dam can be melt down immediately after the construction of the dam body is completed, leaving no wastes that may adversely affect the navigation course or pollute the water body in the riverbed.

DETAILED DESCRIPTION OF THE EMBODIMENTS

A method of dam construction utilizing freezing technique as described in the present invention, which utilizes natural water body as dam material and utilizes freezing technique to construct an ice dam body, comprising the following steps:

1) Choosing the forms, geometry size, shapes, and structural frameworks of unit body, determining the quantity of unit body, and arranging the locations and amount of freezing contacts, according to the dam structure;

2) Arranging unit body formwork according to the forms, geometry size, and shapes of the unit body, pre-reserving distribution sluice gates, and choosing a high-performance heat insulation material of insulation layer to cover the unit body formwork in the freezing part;

3) Pouring water into the unit body formwork to form unit water body, powering up and starting freezing machines to freeze the unit water body to below the freezing point to form solid ice unit body; repeating this step to produce enough ice unit body;

4) Towing the ice unit body with towing equipment to the place where the dam is to be constructed and fixing the ice unit body temporarily, arranging freezing contacts in the gaps between the ice unit bodies, and freezing quickly to form an integral ice dam;

5) Closing the distribution sluice gates from bottom to top successively, till all distribution sluice gates are closed; as the downstream level declines, installing and connecting sluice pipelines for temporary power generation from top to bottom, starting from the upper sluice gate, till the requirements for installation of temporary power generation equipment are met;

6) Installing temporary power generation equipment, and utilizing the temporary power generation equipment to supply power to the freezing machines, to prevent the solid ice unit body from melting down, and thereby form an ice dam; completing the construction of the temporary dam body;

7) Starting the construction of permanent concrete dam body; after the permanent dam body is placed, melting down the ice dam formed by the solid ice unit body, reclaiming the equipment, and completing the normal power generation works.

In step 4) of the present invention, the distribution sluice gates on the ice unit bodies are in fully open state. Since the density of the ice unit body is lower than the density of water and cavities are formed in the ice unit body, the ice unit body will float on water, causing excessive clearance between the bottom surfaces of ice unit body and the riverbed. To solve this problem, for the ice unit body submerged below the water surface, weight-enhancing material must be added into the cavities, to force the ice unit body to settle onto the riverbed.

The operations for implementing the present invention are as follows:

First, select the dam site according to the design requirement, and determine the structural arrangement of the ice dam system (mainly including: dam body, navigation lock, and diversion channel, etc.) according to the requirements for the permanent dam body or temporary dam body.

Determine the quantity of the unit body according to the structural requirements of the dam body, select the forms, geometry size, shapes, and structural framework of the unit body, and determine how to arrange the freezing contacts and determine the amount of the freezing contacts according to the technical requirement. Mount freezing heat exchanging apparatuses in cavity bushings with appropriate dimensions (length, diameter) according to the geometry size of the ice unit body, to form freezing contacts. Determine the spacing between the freezing contacts according to the freezing effect areas of the freezing contacts.

In view that a plurality sets of freezing contacts are arranged on the ice unit body and the ice dam is composed of a plurality of ice unit bodies, reliable automatic monitoring and control systems should be arranged at the freezing contacts, in order to ensure normal operation of the freezing contacts.

With consideration of requirements for energy conservation and cost reduction, the ice unit body should be designed into cavity structure as far as possible, and service passages for the freezing contacts should be considered, in order to eliminate any possible failure of the freezing contacts timely. The part on and above the water surface can be built with ice unit body with cavity structure directly. Due to the fact that the density of the ice unit body is lower than the water and cavities are formed in the ice unit body, the ice unit body will float on water, causing excessive clearance between the bottom surfaces of ice unit body and the riverbed. To solve this problem, appropriate weight-enhancing material can be added into the cavities, to ensure the ice unit body can reach the depth at a time; the weight-enhancing material can be water. The ice unit body are towed and fixed temporarily in the assembling process, to ensure assembling accuracy.

Arrange unit body formwork and pre-reserve distribution sluice gates according to the forms, geometry size, shapes of the unit body. Select a high-performance heat insulation material of insulation layer to cover the framework of freezing part of the unity body, and keep the dam body at a constant temperature. The covering material is used as the material of unit body formwork before freezing. Large-size covering material can be assembled and spliced.

Power on and start up the freezing machines to freeze the water unit body to below the freezing point, so as to form solid ice unit body. Repeat this step to produce enough ice unit body according to the requirement of the design. Towing points should be reserved on the ice unit body at appropriate positions according to the requirement of the design.

Tow the ice unit body with towing equipment (towing boat or windlass) to the design locations and fix them temporarily. Arrange freezing contacts in the gaps between the ice unit bodies and freeze quickly, to form the integral ice dam. At this point, the distribution sluice gates on the ice unit bodies should be in fully open state.

Close the distribution sluice gates from bottom to top successively, till all distribution sluice gates are closed; as the downstream water level declines, install and connect sluice pipelines for temporary power generation from top to bottom, starting from the upper sluice gate, till the requirements for installation of temporary power generation equipment are met;

Select and install temporary power generation equipment in appropriate quantity and model; then, start power generation and switch to maintain the power supply for the ice dam.

Construct the permanent dam body (concrete dam body). After the permanent dam body is placed, melt down the ice dam, reclaim the equipment, and start normal power generation. The reclaimed equipment can be reused.

In the present invention, the construction of permanent dam body (concrete dam body) should be coordinated with the construction of the temporary ice dam, and the construction process of conventional hydropower dam works should match the construction requirements for freezing dam.

During implementation of the present invention, the power supply from the electric network should be scheduled comprehensively, i.e., schedule how long the power supply from the electric network can freeze the ice unit body into ice dam, how much electric power is required to maintain the ice dam body in frozen state, what influences the temporary power generation has on the electric network when the dam body is at constant temperature, how to determine the model, requirement, quantity and installation procedures of the temporary power generation equipment, and how to switch with the electric network timely once temporary power generation is established.

Before implementation of the present invention, basic experiments can be carried out to obtain relevant data, for example, quick freezing experiment of ice dam can be carried out, to determine the dam size, contact distribution, freezing method, freezing speed, water depth drop, water flow speed, water temperature, and relation between keeping constant temperature and power consumption, and relevant data. Experiments on coordination between construction of frozen dam body and construction of permanent dam body can be carried out; experiments on ice dam strength, structure form, water depth drop, water flow speed, and water temperature can be carried out to obtain relevant data; experiments on ice dam melting and component reclamation can be carried out, to obtain relevant data. The experimental data and phenomena can be summarized, to form several feasible construction schemes, and then the construction schemes can be optimized.

Once the method provided in the present invention is applied widely, it will greatly drive the utilization progress of water power resources, and thereby significantly reduce predatory exploitation of other non-environment-friendly resources. Therefore, the method provided in the present invention has important and far-reaching strategic significance in environment protection and national strength building. The method provided in the present invention can also be applied widely in flood fighting, flow closure and strategic military engineering.

The invention claimed is:

1. A method of dam construction utilizing freezing technique, the method utilizing a natural water body as dam material and utilizing a freezing technique to construct an ice dam body, the method comprising the following steps:
   A) choosing forms, geometry size, shapes, and structural frameworks for a plurality of unit bodies, determining the quantity of unit bodies, and arranging locations and amount of freezing contacts, according to the dam structure;
   B) arranging a unit body formwork according to the forms, geometry size, and shapes of the unit body, pre-reserving at least one distribution sluice gate, and choosing a high-performance heat insulation material of insulation layer to cover the unit body form work in the freezing part;
   C) pouring water into the unit body formwork to form unit water body, powering up and starting freezing machines to freeze the unit water body to below the freezing point to form solid ice unit body; repeating this step to produce enough ice unit body;
   D) towing the ice unit body with towing equipment to the place where the dam is to be constructed and fixing the ice unit body temporarily, arranging freezing contacts in the gaps between the ice unit bodies, and freezing quickly to form an integral ice dam;
   E) closing the distribution sluice gates from bottom to top successively, till all distribution sluice gates are closed; as the downstream level declines, installing and connecting sluice pipelines for temporary power generation from top to bottom, starting from the upper sluice gate, till the requirements for installation of temporary power generation equipment are met;
   F) installing temporary power generation equipment, and utilizing the temporary power generation equipment to supply power to the freezing machines, to prevent the solid ice unit body from melting down, and thereby form an ice dam; completing the construction of the temporary dam body;
   G) starting the construction of permanent concrete dam body; after the permanent dam body is placed, melting down the ice dam formed by the solid ice unit body, reclaiming at least one piece of equipment, and completing a normal power generation works.

2. The method of dam construction utilizing freezing technique according to claim 1, wherein, in step D), the distribution sluice gates on the ice unit bodies are in fully open state.

3. The method of dam construction utilizing freezing technique according to claim 1, wherein, the ice unit body has cavity structure, with weight-enhancing material being poured into the cavities to force the ice unit body to settle onto the riverbed.

4. The method of dam construction utilizing freezing technique according to claim 1, wherein, service passages for the freezing contacts are arranged on the ice unit bodies.

5. The method of dam construction utilizing freezing technique according to claim 1, wherein, automatic monitoring and control systems are arranged at the freezing contacts.

* * * * *